(12) United States Patent
Sulaiman et al.

(10) Patent No.: US 12,214,513 B1
(45) Date of Patent: Feb. 4, 2025

(54) APPARATUS AND METHOD FOR ADAPTIVE HANDLING OF SLIDES USING A ROBOTIC ARM

(71) Applicant: Pramana, Inc., Cambridge, MA (US)

(72) Inventors: Mohammad Abdul Sulaiman, Visakhapatnam (IN); Omkar Appasaheb Kabadagi, Bangalore (IN); Vaishnavi K B, Bengaluru (IN); Rameesh Varshan, Chennai (IN); Nitesh Kumar, Bengaluru (IN)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/766,242

(22) Filed: Jul. 8, 2024

(51) Int. Cl.
  *B25J 19/02* (2006.01)
  *B25J 9/16* (2006.01)
  *B25J 13/08* (2006.01)

(52) U.S. Cl.
  CPC .......... *B25J 9/1697* (2013.01); *B25J 9/1628* (2013.01); *B25J 9/1692* (2013.01); *B25J 13/084* (2013.01)

(58) Field of Classification Search
  CPC . B25J 19/023; B25J 9/00; B25J 9/1664; B25J 9/1692; B25J 9/1697; G05B 2219/35506; G05B 2219/39024; G05B 2219/39473; G05B 2219/39536
  See application file for complete search history.

(56) References Cited

U.S. PATENT DOCUMENTS

| | | | |
|---|---|---|---|
| 2020/0023521 A1* | 1/2020 | Dan | B25J 9/1692 |
| 2020/0082230 A1* | 3/2020 | Hoelscher | G06T 7/75 |
| 2020/0262080 A1* | 8/2020 | Ghobadi | B25J 9/1697 |
| 2020/0282575 A1* | 9/2020 | Haeusler | B25J 9/1612 |
| 2021/0023713 A1 | 1/2021 | Zhang et al. | |
| 2021/0291376 A1* | 9/2021 | Wang | G01B 21/042 |
| 2022/0147026 A1* | 5/2022 | Poelman | B25J 9/1653 |
| 2023/0073681 A1 | 3/2023 | Ayyad et al. | |

FOREIGN PATENT DOCUMENTS

| | | |
|---|---|---|
| WO | 2018114114 A1 | 6/2018 |
| WO | 2023102647 A1 | 6/2023 |

* cited by examiner

*Primary Examiner* — Dalena Tran
(74) *Attorney, Agent, or Firm* — Caldwell Intellectual Property Law (57) ABSTRACT

An apparatus and method for adaptive handling of slides using a robot arm. The apparatus includes at least a computing device comprised of a processor and a memory communicatively connected to the processor. The memory instructs the processor to receive a calibration procedure, wherein the calibration procedure is generated using a plurality of waypoints. The processor controls the at least a robotic arm as a function of the calibration procedure, wherein the calibration procedure is configured to cause the robotic arm to pick, using a pick waypoint of the plurality of waypoints, and place, using a place waypoint of the plurality of waypoints, a slide. The processor receives a plurality of feedback from the at least a robotic arm. The processor generates, using the plurality of feedback, an adapted pick waypoint. The memory instructs the processor to generate, using the plurality of feedback, an adapted place waypoint.

20 Claims, 8 Drawing Sheets

APPARATUS AND METHOD FOR ADAPTIVE HANDLING OF SLIDES USING A ROBOTIC ARM

FIELD OF THE INVENTION

The present invention generally relates to the field of robotic automation. In particular, the present invention is directed to an apparatus and a method for adaptive handling of slides using a robot arm.

BACKGROUND

The present technology area relates to robotic automation, specifically focusing on the handling of delicate items such as glass slides. Current systems require precise handling and placement of these items, which can be challenging due to variations in item dimensions and positioning.

SUMMARY OF THE DISCLOSURE

In an aspect, an apparatus for adaptive handling of slides using a robot arm includes at least a processor and a memory communicatively connected to the at least a processor. The memory contains instructions configuring the processor to receive a calibration procedure, wherein the calibration procedure is generated using a plurality of waypoints, control the at least a robotic arm as a function of the calibration procedure, wherein the calibration procedure is configured to cause the robotic arm to pick, using a pick waypoint of the plurality of waypoints, and place, using a place waypoint of the plurality of waypoints, a slide, receive a plurality of feedback from the at least a robotic arm, generate, using the plurality of feedback, an adapted pick waypoint, and generate, using the plurality of feedback, an adapted place waypoint.

In another aspect, a method for adaptive handling of slides using a robot arm includes receiving a calibration procedure, wherein the calibration procedure is generated using a plurality of waypoints, controlling the at least a robotic arm as a function of the calibration procedure, wherein the calibration procedure is configured to cause the robotic arm to pick, using a pick waypoint of the plurality of waypoints, and place, using a place waypoint of the plurality of waypoints, a slide, receiving a plurality of feedback from the at least a robotic arm, generating, using the plurality of feedback, an adapted pick waypoint, and generating, using the plurality of feedback, an adapted place waypoint.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for adaptive handling of slides using a robot arm. The apparatus includes at least a computing device comprised of a processor and a memory communicatively connected to the processor. The memory instructs the processor to receive a calibration procedure, wherein the calibration procedure is generated using a plurality of waypoints. The processor control the at least a robotic arm as a function of the calibration procedure, wherein the calibration procedure is configured to cause the robotic arm to pick, using a pick waypoint of the plurality of waypoints, and place, using a place waypoint of the plurality of waypoints, a slide. The processor receives a plurality of feedback from the at least a robotic arm. Additionally, the processor generates, using the plurality of feedback, an adapted pick waypoint. The memory then instructs the processor to generate, using the plurality of feedback, an adapted place waypoint.

Figure 1:
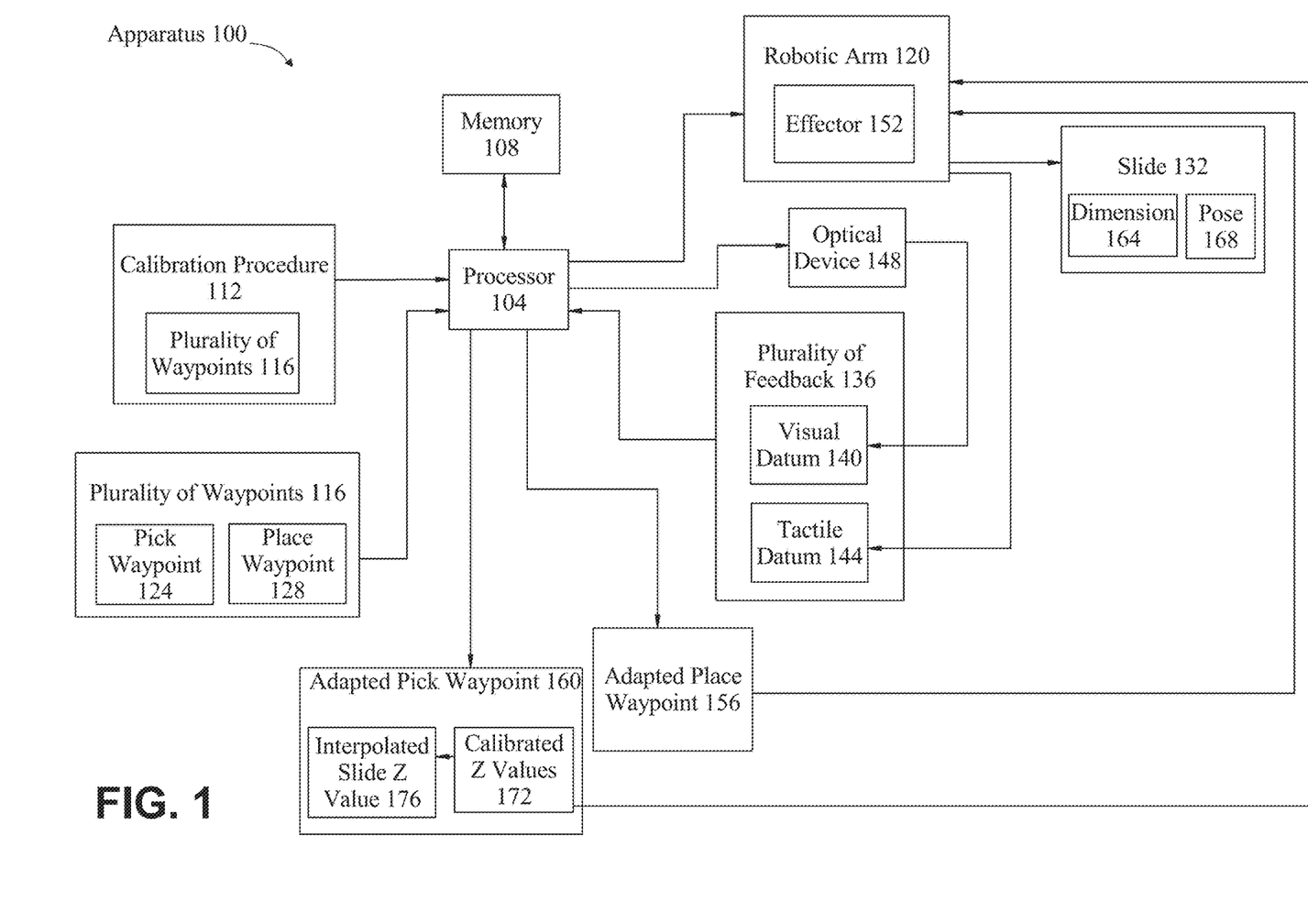
FIG. 1 is a block diagram of an apparatus for adaptive handling of slides using a robot arm.

Referring now to FIG. 1, an exemplary embodiment of apparatus 100 for adaptive handling of slides using a robot arm is illustrated. Apparatus 100 may include a processor 104 communicatively connected to a memory 108. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 104 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 receives calibration procedure 112, wherein the calibration procedure is generated using plurality of waypoints 116. As used in this disclosure, a "calibration procedure" is a systematic series of commands designed to set or adjust the accuracy of a device's performance parameters to ensure precision and consistency in its operation. In some embodiments, calibration procedure may include one or more waypoints such as, as non-limiting examples, pick waypoints and place waypoints. In a non-limiting example, the calibration procedure may involve comparing a device's outputs with a known standard or set of standards and making the requisite adjustments to align the device's outputs with the established waypoints. As used in this disclosure, a "waypoint" is a reference point in physical space used for purposes of navigation. In a non-limiting example, waypoints 116 may be used in sequence to outline a predetermined course or to mark locations of interest. In another non-limiting example, generating waypoints 116 may involve recording the three-dimensional position (i.e., Px, Py, Pz coordinates) and orientation (i.e., Rx, Ry, Rz coordinates) of effector 152 of robotic arm 120 as robotic arm 120 moves through space. For example, without limitation, processor 104 may receive calibration procedure 112 generated using plurality of waypoints 116, where each waypoint marks a specific reference point in physical space. In a non-limiting example, calibration procedure 112 may involve robotic arm 120 recording its three-dimensional position and orientation at each waypoint of plurality of waypoints 116, allowing processor 104 to adjust the arm's movements for precise and consistent operation.

Still referring to FIG. 1, processor 104 controls at least a robotic arm 120 as a function of calibration procedure 112, wherein calibration procedure 112 is configured to cause robotic arm 120 to pick, using pick waypoint 124 of plurality of waypoints 116, and place, using a place waypoint 128 of the plurality of waypoints, a slide. As used in this disclosure, a "robotic arm" is a programmable mechanical device that is designed to perform tasks that mimic the actions of a human arm. Without limitation, robotic arm may consist of a series of segments connected by joints, which may be actuated to move in various directions and at different speeds. In a non-limiting example. Robotic arm 120 may be used in industrial applications to perform repetitive or dangerous tasks with high precision and reliability. Additional embodiments related to robotic arm may be the same or similar to the apparatus described in U.S. patent application Ser. No. 18/382,386, filed on Oct. 20, 2023, entitled "APPARATUS AND METHOD OF USE OF A MECHANISM THAT CONVERTS ROTARY MOTION INTO LINEAR MOTION," which is incorporated herein by reference in its entirety. As used in this disclosure, a "pick waypoint" is a specific type of waypoint that denotes a location where robotic arm 120 or similar device is intended to perform a pick operation. As used in this disclosure, a "pick operation" is an action performed by a robotic arm or similar device to grasp, secure, or otherwise obtain an object from a designated location. Without limitation, this operation may involve the use of an effector, such as a gripper, to physically interact with the object, ensuring it is held firmly and can be moved or manipulated as required. In a non-limiting example, the pick operation may involve grasping or otherwise securing an object or a part thereof. In a non-limiting example, the pick waypoint is used to guide the device to the precise location where the pick operation is to be executed. As used in this disclosure, a "place waypoint" is a specific type of waypoint that indicates a location where robotic arm 120 or similar device is intended to perform a place operation. Without limitation, the place operation may involve depositing or releasing an object or a part thereof that has been previously grasped or secured. In a non-limiting example, place waypoint 128 may be used to guide the device to the exact location where the place operation is to be carried out, ensuring the object is positioned accurately as per the desired outcome of the task. As used in this disclosure, a "slide" is a thin, flat piece of glass that is used to hold objects for examination under a microscope. In a non-limiting example, slide 132 serves as a stable platform upon which samples can be placed, spread, and observed. In a non-limiting example, slide 132 may be used to arrange biological specimens in a fixed position for staining and microscopic analysis. In a non-limiting example, processor 104 may control at least robotic arm 120 as a function of calibration procedure 112, wherein calibration procedure 112 is configured to cause robotic arm 120 to pick a slide using a pick ypoint of the plurality of waypoints. Continuing, without limitation, robotic arm 120 may place slide 132 at a designated location using a place waypoint, ensuring precise and accurate handling throughout the process.

Still referring to FIG. 1, processor 104 receives a plurality of feedback 136 from at least a robotic arm 120. As used in this disclosure, for the purposes of the calibration procedure and components thereof, "feedback" is data or information sent back to processor 104 from robotic arm 120. In a non-limiting example, feedback 136 may consist of various signals or responses generated by robotic arm 120 as it performs task. In a non-limiting example the signals or responses may be received and processed by processor 104 to monitor, control, or adjust the arm's actions. Without limitation, feedback 136 may be essential for ensuring robotic arm 120 operates correctly and can adapt to changing conditions or perform precise movements.

With continued reference to FIG. 1, the plurality of feedback 136 may include visual datum 140 and tactile datum 144. As used in this disclosure, a "visual datum" refers to any piece of information that is represented visually. In a non-limiting example, visual datum 140 may include images, symbols, text, graphs, and animations. Without limitation, visual datum may be used to convey information, represent data, or support decision-making processes. In a non-limiting example, an optical device may provide apparatus 100 with visual datum as described in more detail below. As used in this disclosure, a "tactile datum" refers to a piece of information that can be perceived through the sense of touch. In a non-limiting example, tactile datum 144 may include textures, vibrations, temperature changes, and pressure differences. Without limitation, tactile datum 144 may be used to convey information, represent data, or support decision-making processes through haptic feedback. In a non-limiting example, tactile datum 144 may include textures, such as the difference between a smooth surface and a rough one, which could be detected by robotic arm 120 to identify different materials. Additionally, tactile datum 144 might encompass vibrations, allowing robotic arm 120 to sense and respond to varying levels of oscillations when interacting with machinery. Temperature changes could also serve as tactile data, where robotic arm 120 might perceive shifts in heat or cold to determine environmental conditions or the properties of an object. Furthermore, tactile datum 144 could include pressure differences, enabling a robotic system to gauge the amount of force applied during tasks, ensuring precision and safety.

With continued reference to FIG. 1, visual datum 140 may be generated using a macro image analysis of optical device 148, which may include capturing, using optical device 148, an image, processing, using an image processor, the image, and generating visual datum 140. As used in this disclosure, a "macro image" is an image that captures elements at close range, often larger than life size, to extract detailed information. Without limitation, macro images may be used to examine fine details and subtle variations that are not visible to the naked eye. Without limitation, the macro image may be captured using an optical device to provide high-resolution visual data of a slide, allowing for precise analysis and adjustments during the handling and placement processes. As used in this disclosure, "macro image analysis" is the examination and processing of images that capture subjects at close range, often larger than life size, to extract detailed information. Without limitation, the macro image analysis may involve techniques that may include pattern recognition, object detection, and measurement of features within the image. Without limitation, macro image analysis may be used in applications where fine details and subtle variations are of high interest, such as in quality control, material science, and biological research. Without limitation, macro image analysis may be used in medical imaging to scrutinize tissue samples at a cellular level, potentially aiding in early diagnosis of diseases. As used in this disclosure, an "optical device" is an instrument designed to manipulate, manage, or analyze light. In a non-limiting example, optical device 148 may include components such as lenses, mirrors, filters, gratings, or detectors, and is used in applications ranging from vision correction to the analysis of light properties. In a non-limiting example, optical device 148 may be one or more scanning devices. In a non-limiting example, processor 104 may receive scanned images and/or feedback 136 directly from optical device 148 that scanned a microscope slide. In some cases, optical device 148 may include devices or systems used to digitize slides containing biomedical specimens (e.g., tissue samples). As a non-limiting example, optical device 148 may include digital cameras, digital microscopes, digital pathology scanners, or the like). In some cases, processor 104 may select parameters associated with optical device 148 such as, without limitation, magnification level, focus settings, scanning pattern, or the like. Additional disclosure related to optical device and slide digitization process may be found in U.S. Patent Application No. 63/466,950, filed on May 16, 2023, entitled "SYSTEMS AND METHODS FOR INLINE QUALITY CONTROL OF SLIDE DIGITIZATION," which is incorporated herein by reference in its entirety. Additional disclosure related to optical device and slide digitization process may be found in U.S. patent application Ser. No. 18/602,947, filed on Mar. 12, 2024, entitled "SYSTEMS AND METHODS FOR INLINE QUALITY CONTROL OF SLIDE DIGITIZATION," which is incorporated herein by reference in its entirety. In some embodiments, processor 104 may be configured to control the operation of optical device 148 to automate slide 132 digitization process. For example, and without limitation, processor 104 may send instructions to optical device 148 to scan or rescan selected portions of a slide (e.g., areas identified by x-, y-, and/or z-coordinates or bounding boxes).

With continued reference to FIG. 1, as used in this disclosure, an "image processor" is a device or a set of computational methods that performs operations on an image or sequence of images. These operations may include tasks such as image enhancement, filtering, analysis, feature extraction, pattern recognition, and image compression. The image processor is designed to handle the complex data structures associated with digital images and may operate in real-time or batch processing modes. For example, in a digital camera system, the image processor may be responsible for adjusting color balance and reducing noise in captured photographs. In a medical imaging system, an image processor might be used to enhance the contrast of MRI scans to aid in diagnosis.

With continued reference to FIG. 1, tactile datum 144 may be generated using robotic arm 120 and the at least an effector. As used in this disclosure, an "effector" is a component or assembly within a system that is responsible for executing an action or producing an effect in response to a control signal or instruction, often resulting in a change in the physical state of the system or its environment. In a non-limiting example, effector 152 may be mechanical, electrical, or a combination thereof, and is typically part of a larger system where it performs a specific function upon receiving a command or input. For example, in a robotic system, effector 152 may be a gripper that manipulates objects based on input from the robot's control system. In a non-limiting example, robotic arm 120 may manipulate slide 132 using effector 152, wherein effector 152 may capture and send tactile feedback to processor 104, allowing for adjustments in grip and movement to ensure precise handling.

With continued reference to FIG. 1, an actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

With continued reference to FIG. 1, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting.

Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 1, in some embodiments, actuator may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 1, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIG. 1, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

With continued reference to FIG. 1, at least effector 152 comprises a gripper. As used in this disclosure, a "gripper" is a type of effector specifically designed to grasp, hold, or manipulate objects, typically through mechanical means. Without limitation, a gripper may consist of a set of jaws or fingers that can open and close around an object, and it is commonly used in robotic applications to perform tasks such as picking and placing items, assembly operations, or handling tools. For example, without limitation, a gripper may be employed to handle delicate samples on a slide or to operate scientific instruments.

Still referring to FIG. 1, processor 104 generates, using the plurality of feedback 136, adapted place waypoint 156. As used in this disclosure, an "adapted place waypoint" is a refined waypoint position where a slide is to be placed for analysis or observation. In a non-limiting example, adapted place waypoint 156 is specifically designed to correspond with the optimized slide pose and dimensions, ensuring that slide 132 is correctly oriented and positioned for the intended imaging or observation task. In a non-limiting example, adapted place waypoint 156 is configured to interact with the slide holder and the imaging system to facilitate precise placement and alignment of the glass slide. For example, without limitation, adapted place waypoint 156 may include a marked area on the slide holder that indicates the exact location where a slide of standard dimensions is to be placed.

With continued reference to FIG. 1, generating adapted place waypoint 156 may include determining, using visual datum 140 and a torque sensor, a slide pose and a slide tilt angle, modifying, using the slide tilt angle, the place waypoint to align slide edges (e.g., slide edges 608a) parallel to a basket slot edge (e.g., basket slot edge 612a), and modifying, using tactile datum 144, the waypoint to align slide 132 center to the center of the basket slot. As used in this disclosure, a "torque sensor" is a device that measures and records the torque on a rotating system, such as an engine, crankshaft, gearbox, transmission, rotor, or cap. In a non-limiting example, the torque sensor may be used to ensure precision in the application of torque to prevent over-tightening or under-tightening which could lead to mechanical failure or product malfunction. For example, without limitation, in the context of slide 132 handling operations using robotic arm 120, the torque sensor may be integrated to monitor and control the torque applied by robotic arm 120 when manipulating slide 132 basket to prevent damage to slide 132. Additionally, without limitation, the torque sensor may be used to ensure that effector 152 applies a consistent and appropriate amount of force when picking up or placing slides, thereby enhancing the precision of robotic arm 120 movements. In a non-limiting example, feedback 136 from a torque sensor may be utilized to optimize robotic arm 120 path of motion during the adjustment of its position to accommodate the macro imaging analysis, ensuring that slide 132 is handled delicately and accurately. As used in this disclosure, a "slide pose" is a specific orientation or arrangement of a slide relative to a reference system or apparatus. In a non-limiting example, the reference system or apparatus may include an imaging system or observation apparatus. For example, without limitation, the reference system may include optical device 148. In a non-limiting example, slide 132 pose is intended to optimize the visibility and clarity of the specimen on slide 132 when viewed or analyzed. In a non-limiting example, slide 132 pose may include a particular angle, position, or alignment that enhances the interaction between the light source, the glass slide, and the imaging system's lenses or sensors. For example, in an embodiment, slide 132 pose may be set at a 45-degree angle to the light source to reduce glare and improve image contrast. In another instance, slide 132 pose may involve positioning slide 132 at a specific height or distance from the imaging sensor to achieve the desired focus. Additionally, slide 132 pose may be adjusted to align with polarized light sources to enhance the visualization of birefringent materials within a sample.

With continued reference to FIG. 1, as used in this disclosure, a "slide tilt angle" is the angular deviation of a glass slide from its intended plane of orientation within the imaging system or observation apparatus. In a non-limiting example, deviation may affect the focus and clarity of the image or observation being conducted. In a non-limiting example, the slide tilt may be a variable that can be adjusted or corrected to ensure that slide 132 is parallel to the imaging plane, thereby optimizing the quality of the imaging or observation. For example, without limitation, a slide tilt may be corrected by adjusting the slide holder to bring slide 132 back into the correct orientation. In another example, the imaging system could be equipped with sensors that detect the tilt of slide 132 and automatically adjust the position of slide 132 or the optics to compensate for the tilt. In a non-limiting example, adapted place waypoint 156 could include features that minimize the possibility of slide tilt by ensuring a more secure and precise placement of slide 132.

As used in this disclosure, a "basket slot" is a designated compartment within the slide holder of an imaging system or observation apparatus, intended to receive and secure a glass slide. The basket slot is tailored to accommodate the glass slide's dimensions and to maintain it in a stable position during times when slide 132 is not being imaged using an optical device. In a non-limiting example, the basket slot is structured to ensure that the glass slide remains in the correct orientation and at the proper height. For example, without limitation, the basket slot may be equipped with a spring-loaded mechanism that clamps the glass slide in place. In another example, the basket slot could have a contoured design that matches the profile of the glass slide, preventing lateral movement. In a non-limiting example, the basket slot might include a soft lining material that reduces the risk of glass slide damage when inserting or removing slide 132 from the holder.

With continued reference to FIG. 1, processor 104 may be further configured to control robotic arm 120 as a function of a place sequence, wherein the place sequence may include determining, using visual datum 140, slide dimension 164 and slide pose 168 of slide 132, generating, using slide pose 168, adapted place waypoint 156, generating, using slide dimension 164, adapted place waypoint 156. As used in this disclosure, a "place sequence" is a specific order in which a series of elements are arranged or actions are performed within a process or system. In a non-limiting example, the place sequence may include a deliberate arrangement, positioning, or timing of each element or action is set to achieve a desired outcome or to adhere to a particular protocol. As used in this disclosure, "slide dimension" is a measurement of one or more of length, width, and thickness of a glass slide used in conjunction with the imaging system or observation apparatus. Without limitation, the dimensions may be selected to fit within the slide holder of the imaging system and to be of a size that is suitable for handling and manipulation during the preparation and observation of specimens. In a non-limiting example, slide dimension 164 may be standardized to ensure compatibility with various imaging systems and to facilitate the exchange of slides between different laboratories and researchers. For instance, without limitation, a common slide dimension may be approximately 75 mm in length by 25 mm in width with a thickness of 1 mm. In another non-limiting example, slide dimension 164 may be a smaller for specialized imaging systems, such as 48 mm by 28 mm with a thickness of 0.8 mm. In another non-limiting example, a slide may have larger dimensions, such as 100 mm by 50 mm with a thickness of 1.2 mm, for applications requiring a larger viewing area.

Still referring to FIG. 1, processor 104 generates, using plurality of feedback 136, adapted pick waypoint 160. As used in this disclosure, an "adapted pick waypoint" is a refined position that has been customized or configured for the specific purpose of guiding a picking mechanism or entity to a location where an item is to be picked up. In a non-limiting example, adapted pick waypoint 160 may include a waypoint has been adjusted or tailored based on factors such as the type of item, the environment in which the picking will occur, or the capabilities of the picking mechanism.

With continued reference to FIG. 1, generating adapted pick waypoint 160 may include interpolating, using calibrated Z values 172 corresponding to each corner of a slide basket, a slide Z value as a function of the position of slide 132 relative to the slide basket corners, and modifying, using interpolated slide Z value 176, the pick waypoint. As used in this disclosure, a "calibrated Z value" is a measurement or data point that has been adjusted to account for discrepancies or variances in the Z-axis. In a non-limiting example, the vertical axis in a three-dimensional coordinate system may represent the Z-axis. In a non-limiting example, the calibration may ensure that the Z value accurately represents the intended elevation or depth in relation to a reference plane or datum. For example, without limitation, in a 3D printing application, a calibrated Z value would ensure that each layer of material is deposited at the correct height.

With continued reference to FIG. 1, as used in this disclosure, a "slide basket" is a container or holder designed to organize, store, and transport multiple glass slides in a secure and accessible manner. In a non-limiting example, the slide basket may be used in a laboratory settings where slides are a primary medium for specimen preparation and microscopic examination. In a non-limiting example, slide basket may be constructed from materials that are resistant to chemicals and easy to clean, such as stainless steel or plastic. For example, without limitation, in a medical laboratory, a slide basket may be used to hold slides during the staining process, ensuring that they are not contaminated or mixed up. In a non-limiting example, a slide basket may be used to transport slides from one workstation to another without the risk of slide damage.

With continued reference to FIG. 1, as used in this disclosure, an "interpolated slide Z value" refers to a calculated depth coordinate in a three-dimensional space that corresponds to the position of a glass slide after interpolation has been performed to estimate slide 132 position between two known reference points along the Z-axis, which is typically perpendicular to the plane of the glass slide. In a non-limiting example, interpolated slide Z value 176 may be used to determine the precise focus level for imaging or analysis of specimens on slide 132. For example, without limitation, in a digital microscopy system, interpolated slide Z value 176 may be used to automatically adjust the focus of the microscope to obtain clear images of the sample. In another instance, without limitation, interpolated slide Z value 176 may be employed in a slide scanning apparatus to maintain a consistent focus while slide 132 is moved under the objective lens. Additionally, in automated histopathology, interpolated slide Z value 176 might be used to ensure that the analysis of tissue sections is performed at the correct focal depth, enhancing the accuracy of the diagnosis.

With continued reference to FIG. 1, generating adapted pick waypoint 160 may further include locating, using tactile datum 144 and calibration procedure 112, slide 132 position in the slide basket and modifying, using the slide position, the pick waypoint. As used in this disclosure, a "slide position" refers to the specific location of a slide in three-dimensional space. In a non-limiting example, the slide position may be determined by its coordinates along the X, Y, and Z axes. In a non-limiting example, the slide position may be used to track and control the location of the glass slide during examination and analysis. For example, without limitation, in a digital microscopy system, the slide position is used to navigate to different areas of the specimen for imaging. In a non-limiting example, in a slide scanning apparatus, the slide position is monitored to ensure that slide 132 moves accurately under the objective lens for systematic scanning. In a non-limiting example, in automated histopathology, the slide position may be used to precisely locate areas of interest on the tissue sections for detailed analysis and diagnosis.

With continued reference to FIG. 1, robotic arm 120 may be configured to receive a partial open configuration, execute, using the at least an effector, the partial open configuration, adjust, using a pusher mechanism, slide 132, receive an open configuration, and execute, using the at least an effector, the open configuration. As used in this disclosure, a "partial open configuration" refers to a state of robotic arm 120 in which effector 152 is not fully opened nor fully closed, allowing for controlled interaction with objects. In a nonlimiting example, the partial open configuration may be used to grip or manipulate objects without exerting full force, which could be useful in situations where delicate handling is paramount. For example, without limitation, robotic arm 120 effector 152 in a partial open configuration may be used to gently grasp fragile components without causing damage. In a non-limiting example, the partial open configuration may be employed to handle sensitive biological samples with precision.

With continued reference to FIG. 1, as used in this disclosure, a "pusher mechanism" refers to a component or assembly within robotic arm 120 designed to exert a pushing force on an object to move it from one location to another. As used in this disclosure, a "pushing force" refers to the force exerted by a component or mechanism to move an object from one location to another by applying pressure in a specific direction. In a non-limiting example, the pusher mechanism may be used to manipulate objects in a controlled manner, ensuring precise placement or removal within a process. For example, without limitation, the pusher mechanism may be used to move slide 132 from one position to another position.

With continued reference to FIG. 1, as used in this disclosure, an "open configuration" refers to a state of robotic arm 120 effector 152 where effector 152 is fully extended or opened, allowing for the maximum possible space between gripping or interacting surfaces. In a non-limiting example, the open configuration may be used when robotic arm 120 is not engaging with an object or when it is about to initiate an interaction, such as picking up an object. For example, without limitation, robotic arm 120 effector 152 in an open configuration may be positioned to receive a slide. In another non-limiting example, the open configuration could be used to release a previously held slide.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
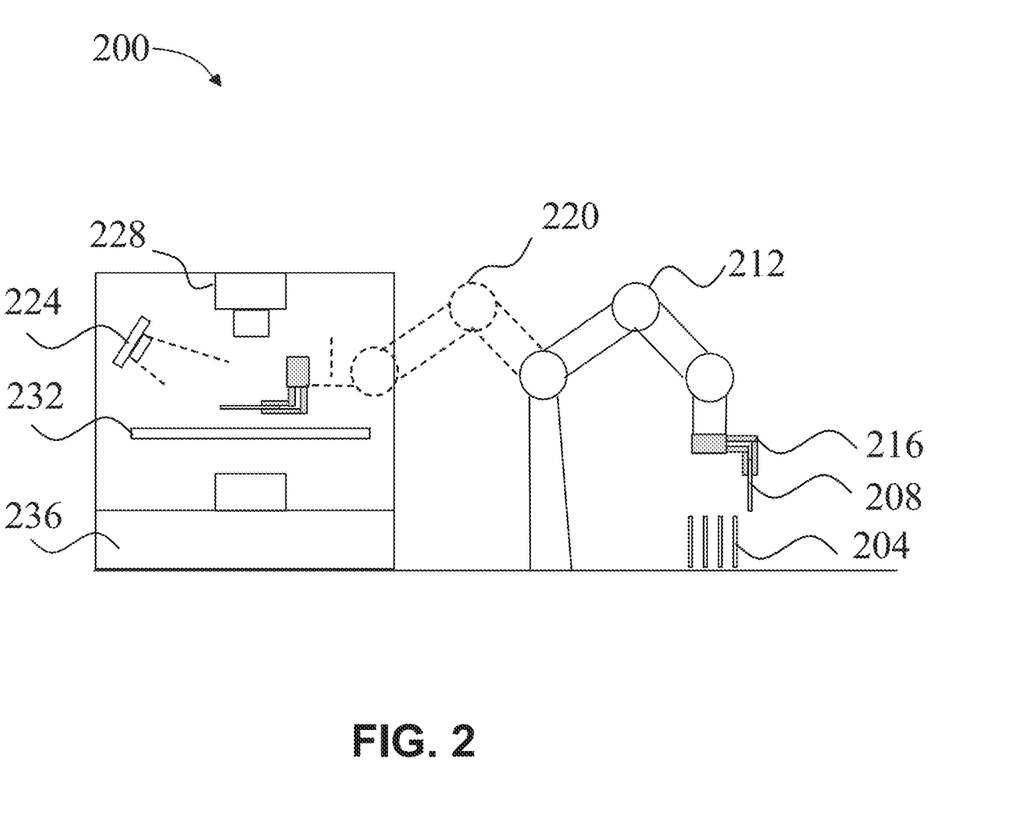
FIG. 2 is an illustration of an exemplary embodiment of the slide handling operations using a robotic arm.

Referring now to FIG. 2, an exemplary embodiment of the slide handling operations using a robotic arm, 200, is illustrated. In an embodiment, the slide basket 204 is designed to securely hold multiple slides 208. In an embodiment, slides 208 are picked up by robotic arm 212 in its first pose, utilizing effector 216 specifically engineered for precise and gentle handling. In an embodiment, effector 216 ensures that slides 208 are gripped securely without causing any damage. In an embodiment, robotic arm 212 transitions to second pose 220. In an embodiment, robotic arm 212 adjusts its position and orientation to align slides 208 with macro imaging analysis 224 system. In an embodiment, the alignment may be critical for ensuring that slides 208 are accurately placed for subsequent analysis.

Without continued reference to FIG. 2, during the transition and positioning process, optical device 228 may provide real-time feedback to the robotic arm. In an embodiment, the feedback may provide information to help monitor the precise handling of each slide 208 as they are moved to various positions on the XY stage 232. In an embodiment, optical device 228 may ensure that robotic arm 212 adjusts its movements accurately, maintaining the correct alignment and orientation of the slides. In an embodiment, this level of precision is necessary to avoid any potential errors or misplacements that could affect the quality of the imaging analysis. In an embodiment, the feedback system allows for continuous monitoring and adjustment, enhancing the overall reliability of the operation.

Without continued reference to FIG. 2, the setup is supported by a robust scanner 236, which may provide stability and precision during the Z Plane adaptation process. In an embodiment, the slide handling operations may involve fine adjustments in the vertical positioning of the slides to ensure that they are at the optimal focal point for imaging. In an embodiment, the scanner's stability may ensure that there are no vibrations or shifts that could disrupt the imaging process. In a non-limiting example, integrating robotic arm 212, effector 216, optical device 228, and scanner 236, may enable the system to achieve high levels of accuracy and efficiency in handling and analyzing slides. In an embodiment, the integrated approach may improve the reliability of the imaging results and enhance the overall workflow, making it more efficient and less prone to errors.

Figure 3A:
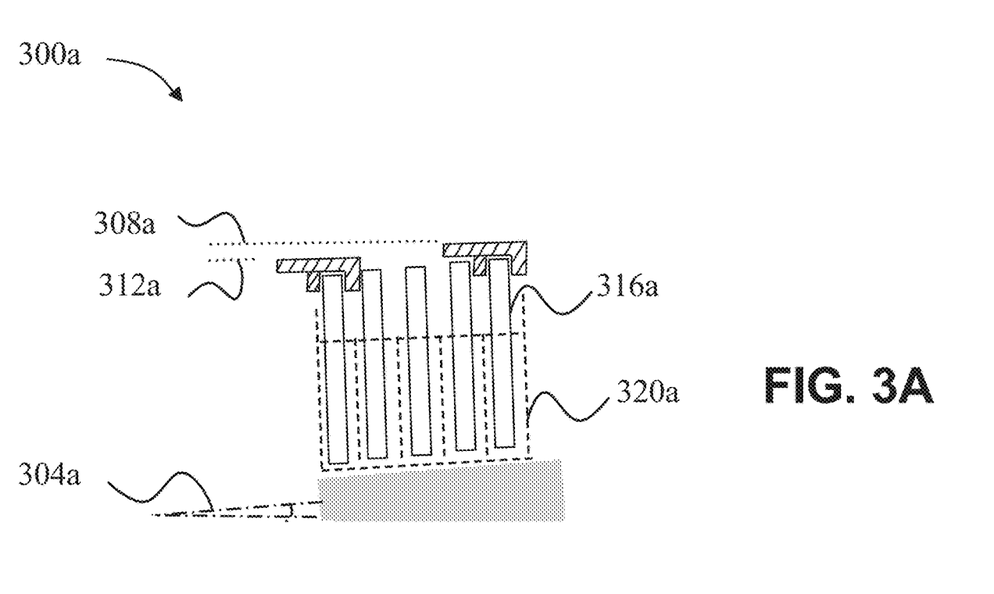
FIGS. 3A and 3B illustrate an exemplary embodiment of Z Plane adaptation during pick.
Figure 3B:
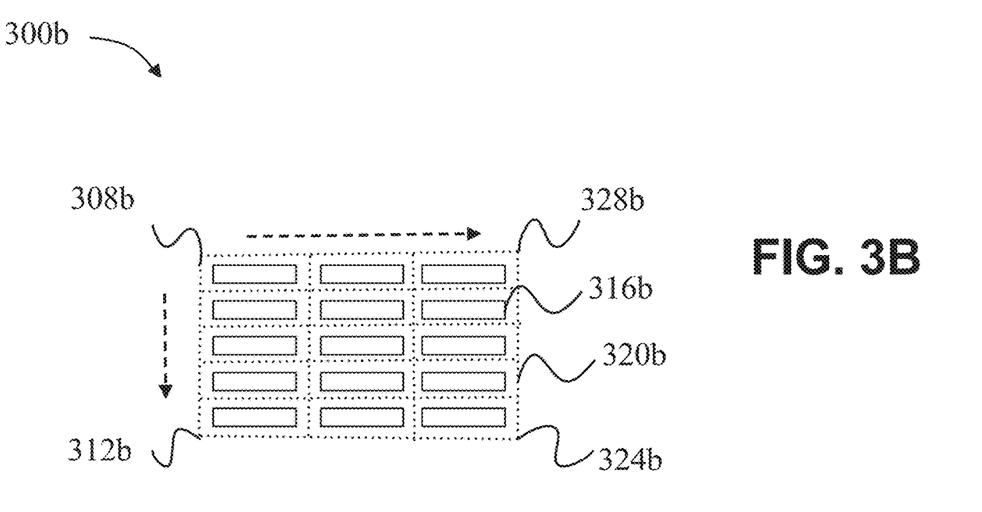

Referring now to FIGS. 3A and 3B illustrate an exemplary embodiment of Z Plane adaptation during pick. FIGS. 3A and 3B depicts orthogonal views of a system where the slide-basket is positioned on an inclined surface 300a and 300b during the slide handling process.

FIG. 3A, a system where the slide-basket is positioned on an inclined surface 300a may be shown interacting with a Z1 position 308a positioned on an inclined surface 304a. In an embodiment, Z2 position 312a may be aligned above a slide 316a, with a slide basket 320a capturing the image for alignment purposes. In an embodiment, the setup may illustrate how the robotic arm is force feedback sensitive and stops operation to avoid breaking glass slides if the gripper hits a slide. In an embodiment, the surface may be inclined, the slides in the slide-basket may sit at different heights (Z levels). In an embodiment, if the Z level of the gripper is not adapted for each slide, the gripper could hit a slide, halting the operation due to force feedback.

FIG. 3A illustrates an example of a slide-basket positioned on an inclined surface. In an embodiment, the surface inclination may be static and is found during the robotic arm calibration process. In an embodiment, the robotic arm may be forcing feedback sensitive and stop operation to avoid breaking glass slides in case the gripper hits a slide. In an embodiment, as the surface is inclined, the slides in the slide-basket may sit at different heights (Z levels). In an embodiment, i In an embodiment, f the Z level of the gripper is not adapted for each slide, the gripper might hit a slide, and the operation could be halted due to force feedback.

FIG. 3B, illustrates a system, 300b, where the Z values of the inclined surface at the corners of the slide basket after the slide pose has been corrected. In an embodiment, Z2 position 312b may be correctly aligned with the slide 316b, as indicated by the Z3 position 324b. In an embodiment, Z1 position 308b may be shown in the background, and the Z4 position 328b may be marked to illustrate the adjustment process. In an embodiment, slide basket 320b may continue to provide visual feedback to ensure precise alignment. In an embodiment, Z values for each corner of the inclined surface might be found using interpolation of the corner Z values, ensuring that the gripper's Z level is accurately adapted for each slide. In an embodiment, the process may help in maintaining the precise handling and placement of the slides, avoiding any operational disruptions.

Figure 4A:
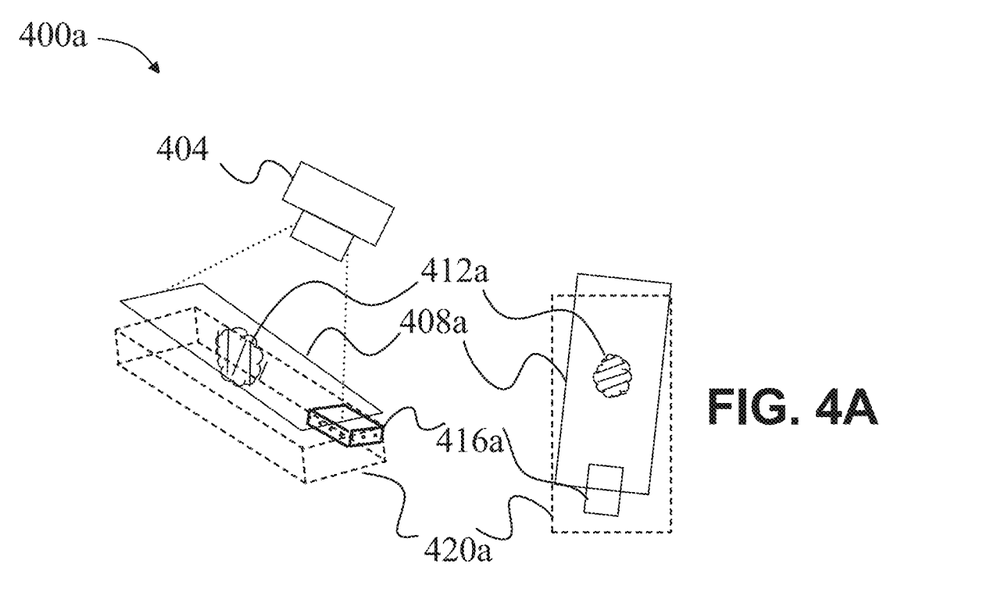
FIGS. 4A and 4B illustrate an exemplary embodiment of Slide Pose adaptation before placing the slide on XY stage.
Figure 4B:
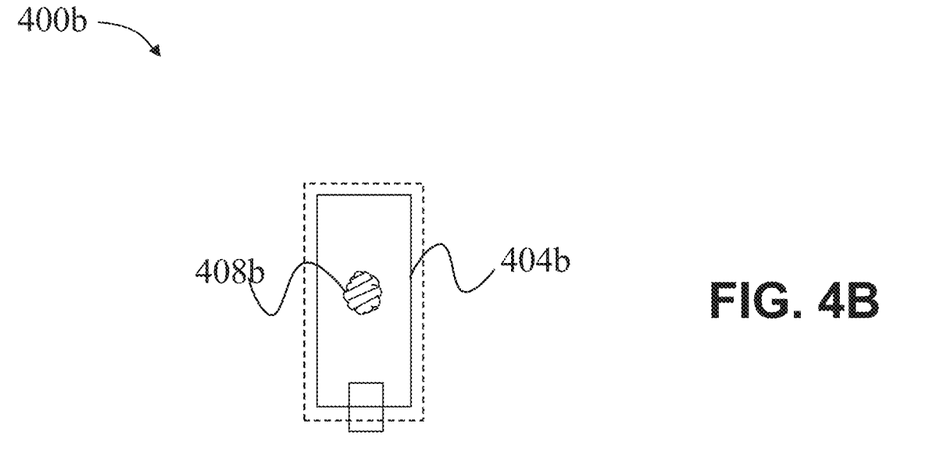

Referring now to FIGS. 4A and 4B illustrate an exemplary embodiment of slide pose adaptation before placing the slide on XY stage, 400a-b. FIG. 4A, illustrates a system diagram of slide pose adaptation before placing the slide on XY stage 400a. In an embodiment, imaging, using macro camera 404, of slide 408a with tissue sample 412a is shown. In an embodiment, slide 408a may be held by gripper 416a in a closed configuration for placement on XY stage for scanning. In an embodiment, gripper 416a in closed configuration may securely hold slide 408a. In an embodiment, slide 408a may be aligned with the slot so that slide 408a can be locked securely by a pusher mechanism while scanning.

FIG. 4B, illustrates a macro image of slide held by gripper over the slot after slide pose adaptation, 400b. FIG. 4B shows the corrected pose of slide 404b based on the macro image analysis of slide 404b. In an embodiment, the orientation is corrected using movement of gripper 416a, whereas the position of slide 404b and slot may be aligned by moving either gripper 416a or XY stage 420a.

Figure 5A:
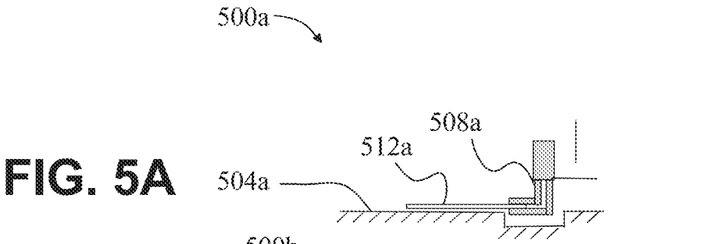
FIG. 5A-F illustrate an exemplary embodiment of the procedure to handle slides that may stick to gripper jaws.
Figure 5B:
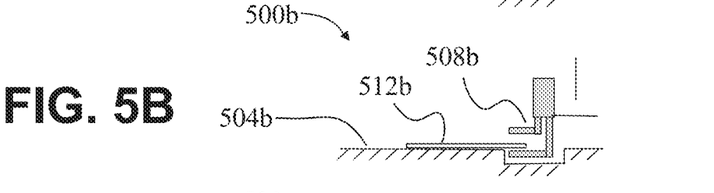
Figure 5C:
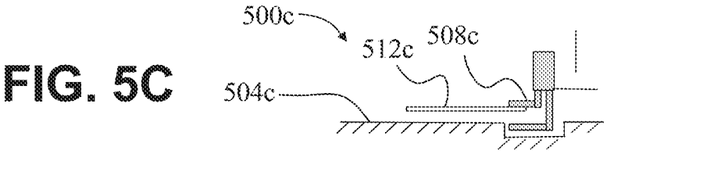

Referring now to FIG. 5A-F illustrate an exemplary embodiment of the procedure to handle slides that may stick to gripper jaws, 500a-f. In FIG. 5A, XY stage 504a receives, using gripper 508a, slide 512a. In an embodiment, gripper 508a is in a closed configuration and holding slide 512a. As used in this disclosure, a "closed configuration" is the state or arrangement in which the components of a device are positioned to hold or secure an object firmly in place, preventing movement or release of the object. For example, without limitation, the closed configuration is the state where the gripper jaws are in proximity to each other to grasp and hold slide 512a securely during transport. In FIG. 5B, XY stage 504a receives, using gripper 508b, slide 512b. In an embodiment, gripper 508b is in the open configuration and holding slide 512b. In FIG. 5C, XY stage 504c receives, using gripper 508c, slide 512c. In an embodiment, gripper 508c is in the open configuration and holding slide 512a, where slide 512a is sticky, and does not get placed on XY stage 504c of the scanner as intended but remains stuck to gripper 508c.

Figure 5D:
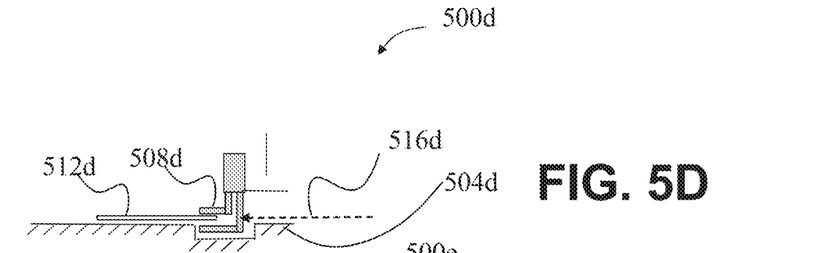
Figure 5E:
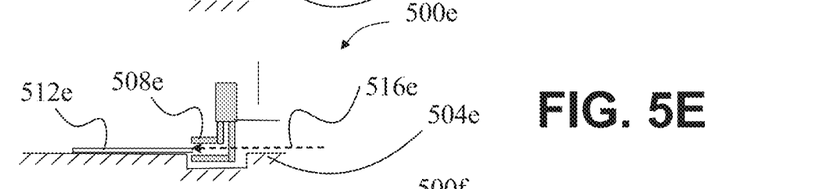
Figure 5F:
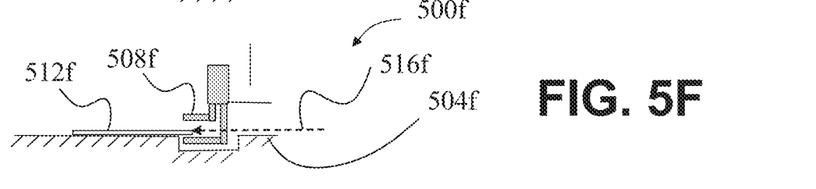

FIG. 5D-E, illustrate how to handle stick slides on XY stage, 500d-f. In an embodiment, FIG. 5D shows gripper 508d in a partially open configuration allowing for movement of slide 512d. FIG. 5E shows slide 512e being pushed out of gripper 508e in the partially opened configuration using pushing mechanism 516e onto XY stage 504c. FIG. 5F shows the final step, where gripper 508f is in the open configuration and pushing mechanism 516f completing the action of moving slide 512f on to XY stage 504f.

Figures 6A, 6B, 6C, 6D, 6E:
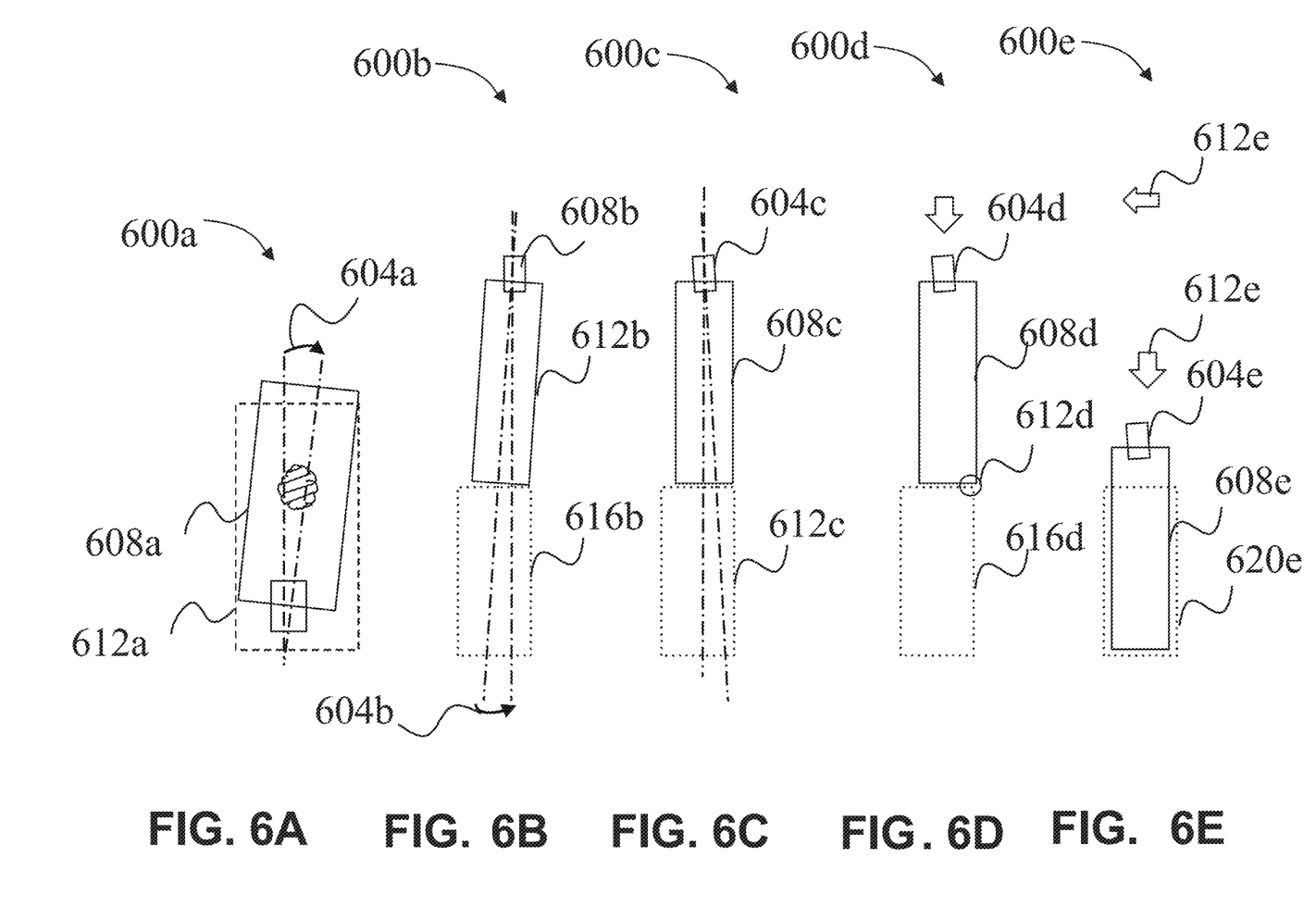
FIG. 6A-E illustrate an exemplary embodiment of slide pose adaptation before placing it back in slide basket.

Referring now to FIG. 6A-E illustrate of an exemplary embodiment of slide pose adaptation before placing it back in slide basket, 600a-c. FIG. 6A shows the macro image of the slide after scanning completion, 600a. In an embodiment, slide is picked up from the XY stage and held by gripper at an angle called slide tilt angle 604a where slide edge 608a is not parallel with basket slot edge 612a. FIG. 6B shows the scenario where slide 612b is being placed back in slide basket 616b using gripper 608b, 600b. In an embodiment, due to tilt angle 604b, slide 612b orientation is not parallel to slide basket 616b walls. FIG. 6C shows the adaptation of slide pose using the tilt angle leading to correct orientation with slide 608c edges aligning in parallel to slide basket 612c slot edges. In an embodiment, this scenario shows the position of slide basket 612c not centered with the slot and during place operation into slide basket 612c, slide 608c May hit slide basket 612c. FIG. 6D shows tactile feedback, collected from torque sensor, being used to determine which edge 612d of slide 608d (left or right) came into contact with slide basket 616d and adapt the position to center slide 608d in the slot. FIG. 6E shows the final step of placing slide 608e in slide basket 620e after adapting the orientation and position of slide 608e to slide basket 620e. In an embodiment, gripper 604e may adjust slide 608e position as illustrated by indication arrows 612c.

Figure 7:
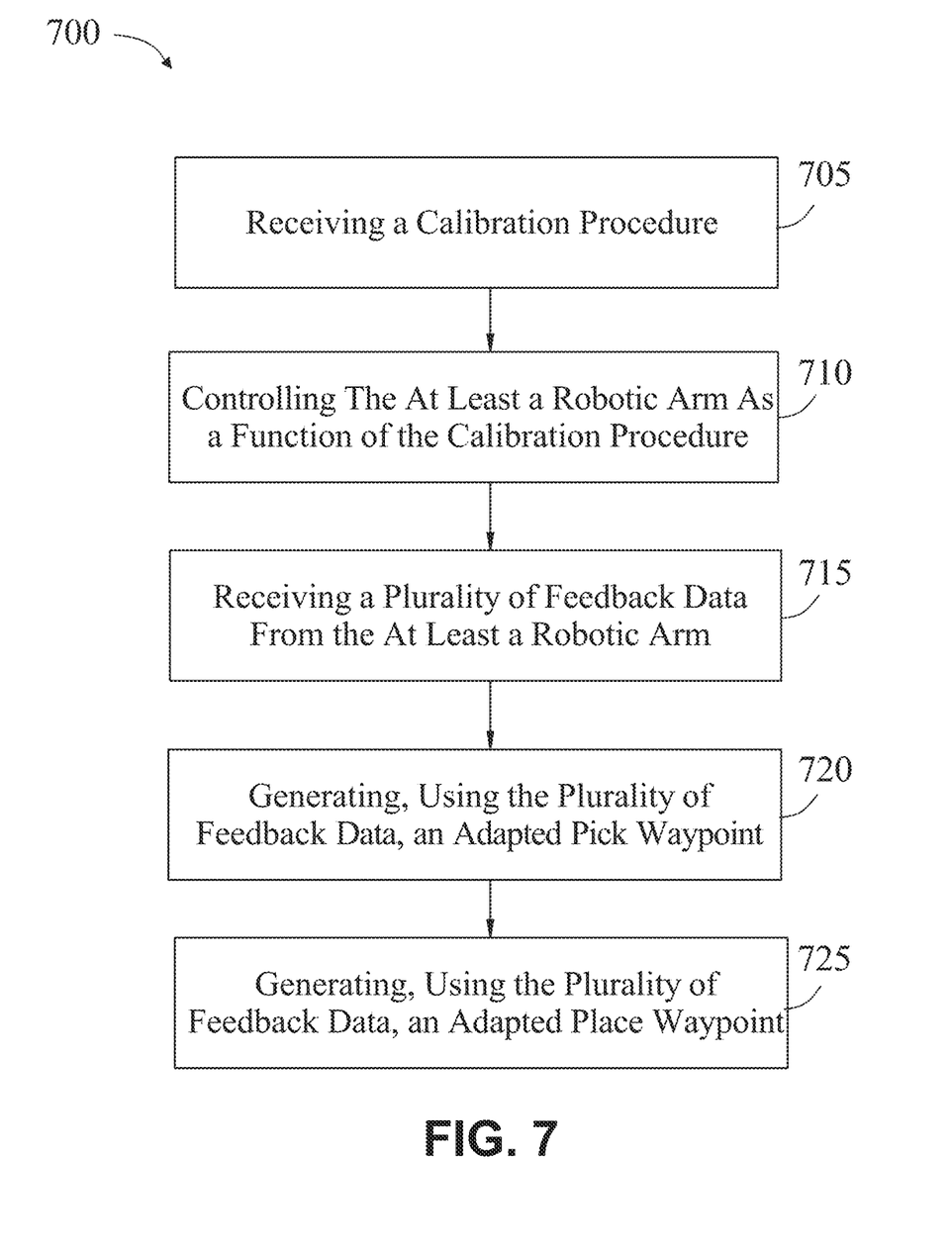
FIG. 7 is a block diagram of an exemplary method for adaptive handling of slides using a robot arm.

Referring now to FIG. 7, a flow diagram of an exemplary method 700 for adaptive handling of slides is illustrated. At step 705, method 700 includes receiving, using at least a processor, a calibration procedure, wherein the calibration procedure is generated using a plurality of waypoints. This may be implemented as described and with reference to FIGS. 1-6.

Still referring to FIG. 7, at step 710, method 700 includes controlling the at least a robotic arm as a function of the calibration procedure, wherein the calibration procedure is configured to cause the robotic arm to pick, using a pick waypoint of the plurality of waypoints, and place, using a place waypoint of the plurality of waypoints, a slide. This may be implemented as described and with reference to FIGS. 1-6.

Still referring to FIG. 7, at step 715, method 700 includes receiving, using at least a processor, a plurality of feedback from the at least a robotic arm. Without limitation, the plurality of feedback may include a visual datum and a tactile datum. In a non-limiting example, the visual datum may be generated using a macro image analysis of the at least an optical device. Without limitation, the tactile datum may be generated using the robotic arm and the at least an effector. This may be implemented as described and with reference to FIGS. 1-6.

Still referring to FIG. 7, at step 720, method 700 includes generating, using the plurality of feedback, an adapted pick waypoint. Without limitation, generating the adapted pick waypoint may include interpolating, using calibrated Z values corresponding to each corner of a slide basket, a slide Z value as a function of the position of the slide relative to the slide basket corners, and modifying, using the interpolated slide Z value, the pick waypoint. In a non-limiting example, generating the adapted pick waypoint may further include locating, using the tactile datum and the calibration procedure, a slide position in the slide basket and modifying, using the slide position, the pick waypoint. This may be implemented as described and with reference to FIGS. 1-6.

Still referring to FIG. 7, at step 725, method 700 includes generating, using the plurality of feedback, an adapted place waypoint. Without limitation, generating the adapted place waypoint may include determining, using the visual datum and a torque sensor, the slide pose and a slide tilt angle, modifying, using the slide tilt angle, the place waypoint to align the slide edges parallel to a basket slot edge, and modifying, using the tactile datum, the waypoint to align the slide center to the center of the basket slot. This may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
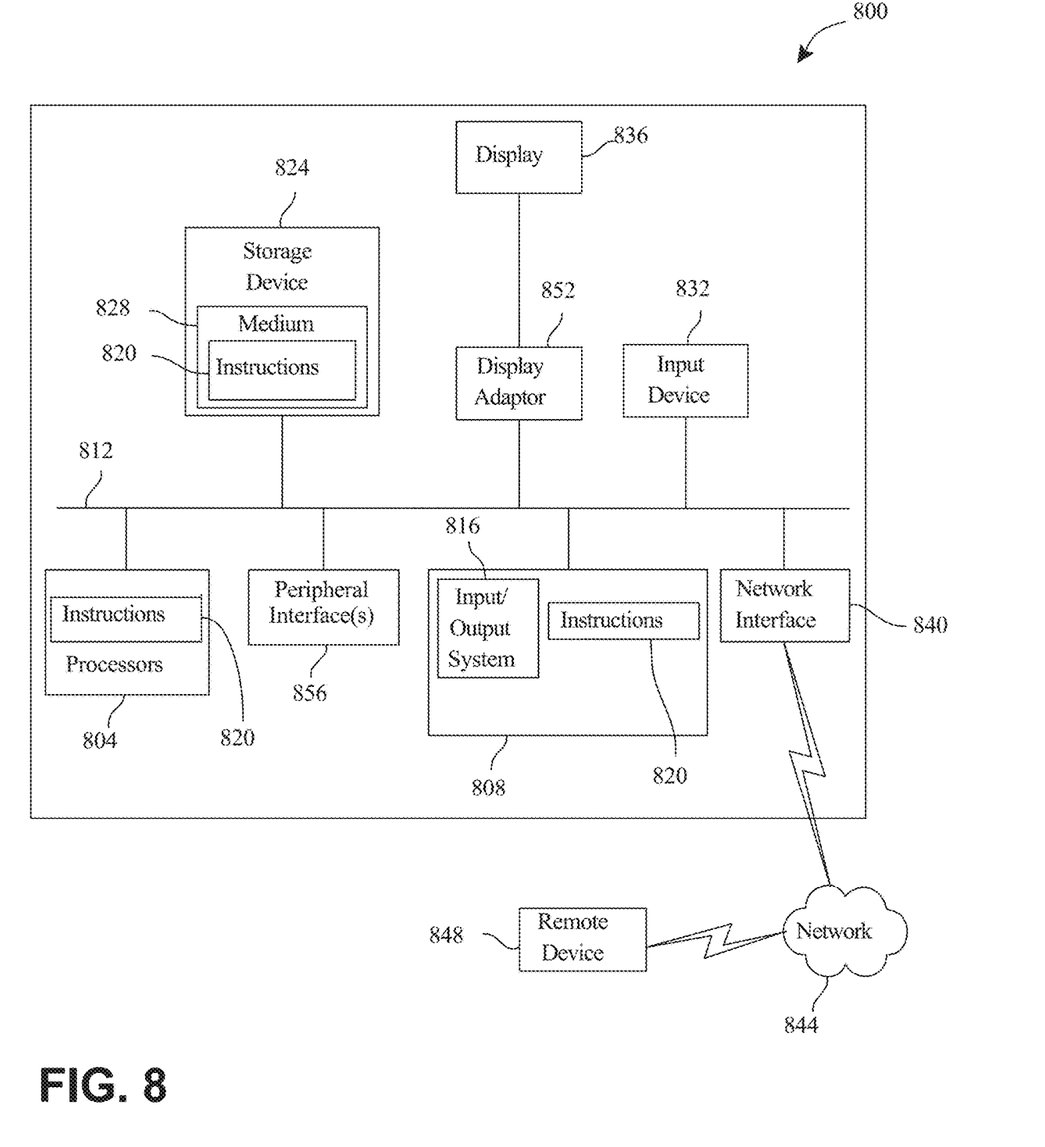
FIG. 8 is a block diagram of a computing system that can be used to implement any one or more of the methodologies disclosed herein and any one or more portions thereof.

FIG. 8 shows a diagrammatic representation of one embodiment of computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a micro-controller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 924 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for adaptive handling of slides, wherein the apparatus comprises:
    at least a robotic arm, wherein the at least a robotic arm comprises at least an effector;
    at least an optical device;
    at least a computing device, wherein the computing device comprises:
        a memory; and
        at least a processor communicatively connected to the memory, wherein the memory contains instructions configuring the at least a processor to:
            receive a calibration procedure, wherein the calibration procedure is generated using a plurality of waypoints;
            control the at least a robotic arm as a function of the calibration procedure, wherein the calibration procedure is configured to cause the robotic arm to pick, using a pick waypoint of the plurality of waypoints, and place, using a place waypoint of the plurality of waypoints, a slide;
            receive a plurality of feedback from the at least a robotic arm;
            generate, using the plurality of feedback, an adapted pick waypoint;
            generate, using the plurality of feedback, an adapted place waypoint.

2. The apparatus of claim 1, wherein generating the adapted pick waypoint comprises:
    interpolating, using calibrated Z values corresponding to each slide basket corner, a slide Z value as a function of a position of the slide relative to the slide basket corner; and
    modifying, using the interpolated slide Z value, the pick waypoint.

3. The apparatus of claim 1, wherein the plurality of feedback comprises a visual datum and a tactile datum.

4. The apparatus of claim 3, wherein the visual datum is generated using a macro image analysis of the at least an optical device, comprising:
    capturing, using the at least an optical device, an image processing, using an image processor, the image; and
    generating the visual datum.

5. The apparatus of claim 3, wherein the tactile datum is generated using the robotic arm and the at least an effector.

6. The apparatus of claim 3, wherein generating the adapted pick waypoint further comprises:
    locating, using the tactile datum and the calibration procedure, a slide position in a slide basket; and
    modifying, using the slide position, the pick waypoint.

7. The apparatus of claim 3, wherein the at least a processor is further configured to control the robotic arm as a function of a place sequence, wherein the place sequence comprises:
   determining, using the visual datum, a slide dimension and a slide pose of the slide;
   generating, using the slide pose, the adapted place waypoint;
   generating, using the slide dimension, the adapted place waypoint.

8. The apparatus of claim 3, wherein generating the adapted place waypoint comprises:
   determining, using the visual datum and a torque sensor, a slide pose and a slide tilt angle;
   modifying, using the slide tilt angle, the place waypoint to align slide edges parallel to a basket slot edge; and
   modifying, using the tactile datum, the waypoint to align a slide center to the center of the basket slot.

9. The apparatus of claim 1, wherein the robotic arm is configured to:
   receive a partial open configuration;
   execute, using the at least an effector, the partial open configuration;
   adjust, using a pusher mechanism, the slide;
   receive an open configuration; and
   execute, using the at least an effector, the open configuration.

10. The apparatus of claim 1, wherein the at least an effector comprises a gripper.

11. A method for adaptive handling of slides, wherein the method comprises:
   receiving, by at least a processor, a calibration procedure, wherein the calibration procedure is generated using a plurality of waypoints;
   controlling, by the at least a processor, the at least a robotic arm as a function of the calibration procedure, wherein the calibration procedure is configured to cause the robotic arm to pick, using a pick waypoint of the plurality of waypoints, and place, using a place waypoint of the plurality of waypoints, a slide;
   receiving, by the at least a processor, a plurality of feedback from the at least a robotic arm;
   generating, by the at least a processor and using the plurality of feedback, an adapted pick waypoint;
   generating, by the at least a processor and using the plurality of feedback, an adapted place waypoint.

12. The method of claim 11, wherein generating the adapted pick waypoint comprises:
   interpolating, using calibrated Z values corresponding to each corner of a slide basket, a slide Z value as a function of a position of the slide relative to the slide basket corner; and
   modifying, using the interpolated slide Z value, the pick waypoint.

13. The method of claim 11, wherein the plurality of feedback comprises a visual datum and a tactile datum.

14. The method of claim 13, further comprising generating the visual datum using a macro image analysis of at least an optical device, comprising:
   capturing, using the at least an optical device, an image processing, using an image processor, the image; and
   generating the visual datum.

15. The method of claim 13, wherein the tactile datum is generated using the robotic arm and the at least an effector.

16. The method of claim 13, wherein generating the adapted pick waypoint further comprises:
   locating, using the tactile datum and the calibration procedure, a slide position in a slide basket; and
   modifying, using the slide position, the pick waypoint.

17. The method of claim 13, further comprising controlling, using the at least a processor, the robotic arm as a function of a place sequence, wherein the place sequence comprises:
   determining, using the visual datum, a slide dimension and a slide pose of the slide;
   generating, using the slide pose, the adapted place waypoint;
   generating, using the slide dimension, the adapted place waypoint.

18. The method of claim 13, wherein generating the adapted place waypoint comprises:
   determining, using the visual datum and a torque sensor, a slide pose and a slide tilt angle;
   modifying, using the slide tilt angle, the place waypoint to align slide edges parallel to a basket slot edge; and
   modifying, using the tactile datum, the waypoint to align a slide center to the center of the basket slot.

19. The method of claim 11, further comprising:
   receiving, by the robotic arm, a partial open configuration;
   executing, by the robotic arm and using the at least an effector, the partial open configuration;
   adjusting, by the robotic arm and using a pusher mechanism, the slide;
   receiving, by the robotic arm, an open configuration; and
   executing, by the robotic arm and using the at least an effector, the open configuration.

20. The method of claim 11, wherein the at least an effector comprises a gripper.

* * * * *